Nov. 3, 1959 A. PASQUALONE ET AL 2,910,899
HOSE CLAMP TOOL
Filed Dec. 22, 1958
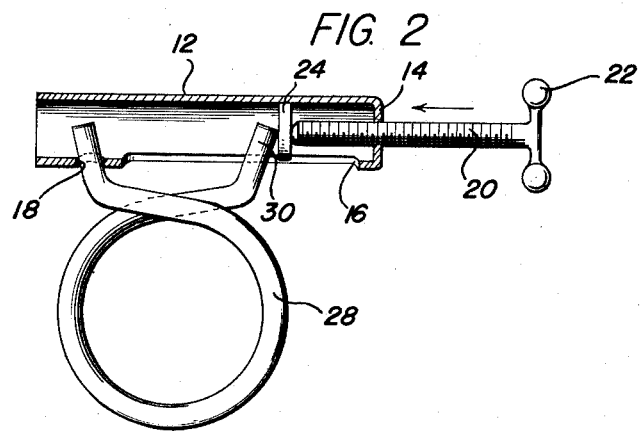
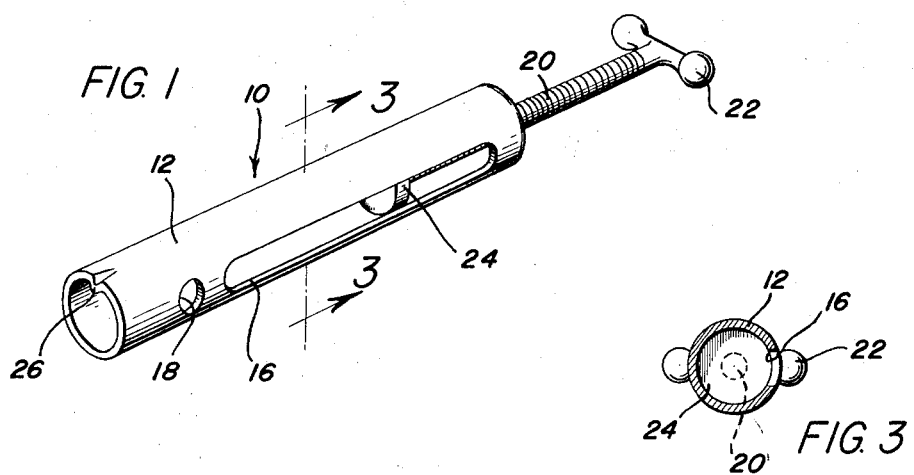
INVENTORS
ANTHONY PASQUALONE
BY FRED BARNES

# United States Patent Office 2,910,899
Patented Nov. 3, 1959

2,910,899

HOSE CLAMP TOOL

Anthony Pasqualone and Fred Barnes, Geneva, Ohio

Application December 22, 1958, Serial No. 781,961

3 Claims. (Cl. 81—9.3)

The present invention generally relates to a hand tool and more particularly to a tool for use in removing and replacing a wire type hose clamp.

There currently is employed a type of hose clamp constructed of shape retaining resilient wire having overlapping end portions with each end terminating in outwardly extending end portions disposed in diverging relation. This type of clamp is employed on various types of installations and especially for holding radiator hoses in place in an automotive vehicle in which the space is restricted thus making it difficult to remove or replace the clamps. Therefore, it is the primary object of the present invention to provide a tool for facilitating the removal and replacement of this type hose clamp.

Another object of the present invention is to provide a tool including an opening for receiving one of the ends of a hose clamp and a screw threaded member having an abutment for engagement with the other end of a clamp for moving the ends of the clamp towards each other for increasing the effective diameter of the clamp.

A further object of the present invention is to provide a tool in accordance with the preceding object which is simple in construction, efficient in use, easy to operate and generally inexpensive to manufacture.

Still other objects and advantages will appear from the following description of an exemplifying embodiment of this invention, from the appended claims and from the accompanying drawings:

Figure 1 is a longitudinal sectional view of the tool illustrating the relationship of the hose clamp and the tool;

Figure 2 is a perspective view of the tool; and

Figure 3 is a transverse sectional view taken substantially upon a plane passing along section line 3—3 on Figure 2.

Referring now specifically to the drawings the numeral 10 generally designates the tool of the present invention which includes an elongated cylindrical member 12 having a closed end 14, an elongated longitudinal slot 16 in the wall and an opening 18 in spaced relation to the end of the slot with the opening 18 being in alignment with the slot 16.

An elongated threaded member 20 is screw threaded through an opening in the closed end 14 whereby rotation of member 20 in relation to cylindrical member 12 will cause longitudinal movement of the threaded member 20. The outer end of the threaded member 20 includes a transversely extending handle 22 and the inner end of the threaded member 20 is engaged with a washer 24 that is freely movable in the cylindrical member 12 and is completely free of the threaded member 20. A detent 26 is provided in the outer end of the cylindrical member 12 for retaining the washer 24 in the cylindrical member 12. In lieu of this, the washer could be freely and rotatably connected to the threaded member 20.

In use, the hose clamp 28 has one end 30 inserted into opening 18 or in the end of the slot 16 with the other end inserted through the slot and engaged by the washer 24 as shown in the drawings. Then by manipulating the handle 22, the ends 30 may be moved towards each other for increasing the internal diameter of the ring-like clamp. The close fit between the ends 30 and the opening and slot permits the lateral movement of the cylindrical member to move the clamp laterally for removing or positioning the same.

It is understood that this invention is not confined to the particular embodiment shown and described, the same being merely illustrative, and that this invention may be carried out in other ways within the scope of the appended claims without departing from the spirit of the invention as it is obvious that the particular embodiment shown and described is only one of the many that may be employed to attain the objects of this invention.

We claim:

1. A tool for removing wire hose clamps of the type having diverging and outwardly extending terminal ends, said tool comprising an elongated cylindrical member, a threaded member extending longitudinally of the cylindrical member, a handle on said threaded member for rotation thereof, an abutment on the end of said threaded member disposed within the cylindrical member, and means forming lateral openings in the cylindrical member for receiving the ends of a hose clamp with one end of the clamp held stationary and the other end of the clamp engageable with the abutment for movement in relation to each other for varying the size of the clamp said means including an elongated slot in said cylindrical member for receiving both ends of the clamp with one end engaging the end of the slot and the other end of the clamp engageable with the abutment on the inner end of the threaded member.

2. A tool for removing wire hose clamps of the type having diverging and outwardly extending terminal ends, said tool comprising an elongated cylindrical member, a threaded member extending longitudinally of the cylindrical member, a handle on said threaded member for rotation thereof, an abutment on the end of said threaded member disposed within the cylindrical member, and means forming lateral openings in the cylindrical member for receiving the ends of a hose clamp with one end of the clamp held stationary and the other end of the clamp engageable with the abutment for movement in relation to each other for varying the size of the clamp said means including an elongated slot and an aperture in spaced relation to the end of the slot with one end of the clamp received in the opening and the other end received in the slot and disposed in the path of movement of the abutment on the screw threaded member.

3. A tool for removing and applying wire hose clamps of the type having diverging and outwardly extending terminal ends, said tool comprising an elongated tubular member, a threaded member extending longitudinally of the tubular member, handle means connected with the threaded member for rotation thereof, abutment means on the inner end of the threaded member for longitudinal movement with the threaded member, said tubular member having a longitudinal slot therein for receiving the ends of the hose clamp with one end of the clamp engaging one end of the slot and the other end of the hose clamp engaging the abutment means whereby longitudinal movement of the abutment means will alter the relation between the ends of the clamp and alter the diameter thereof.

References Cited in the file of this patent

FOREIGN PATENTS 400,139   Great Britain _____ Oct. 19, 1933